Patented Sept. 7, 1948

2,448,896

UNITED STATES PATENT OFFICE 2,448,896

SYNTHETIC VANILLA FLAVOR

Charles Levy, Paterson, N. J.

No Drawing. Application June 13, 1945,
Serial No. 599,311

1 Claim. (Cl. 99—140)

This invention relates to a vanillin product fully equal and superior in many respects to the natural vanilla bean.

More specifically, this invention concerns the combination of vanillin with other ingredients in certain specified proportions so as to produce an artificial vanilla flavor having the full inherent body of natural vanilla. In contrast to previous unsuccessful attempts to produce a product satisfying this important qualification, my product, which can readily be made from well known ingredients which are easily available almost anywhere, is readily soluble in nearly all proportions when used in standard recipes well known in the culinary art.

After close observation of my product during processing and in connection with the production of many food materials such as ice cream, candy, syrup, flavored drinks, and bakery products and the like, I am able to state that my product remains clear under most conditions. Where prior products developed rancidness or became sour after prolonged storage or treatment under adverse climatic conditions, my compositions remained perfectly sweet and showed themselves non-rancid. Even after prolonged baking, cooking or freezing, no loss of flavor efficiency due to baking out, cooking out or freezing out of the improved flavor composition has been detected. In spite of all these advantages, it will readily appear that compositions in accordance with this invention comprise economical ingredients and can be manufactured economically.

For further comprehension of the invention, and of the objects and advantages thereof, reference will be had to the following description and to the appended claims in which the various novel features of the invention are more particularly set forth.

In the execution of the instant invention, it is preferred to first dissolve a relatively small amount of vanillin which is commercially available as technical vanillaldehyde produced from either natural or synthetic sources such as the waste sulfide liquors of the pulp industry, in more than six times its weight in very pure alcohol. These solubility characteristics of vanillaldehyde make it necessary to use such a very high grade alcohol to dissolve the vanillin either hot or cold and, as a matter of fact, one hundred and ninety proof ethyl alcohol is preferred.

An amount of coumarin, commercially available as the technical coumarinic lactone, only a fraction of the amount of vanillin should be introduced with the vanillin or shortly thereafter. An amount of caramel equal in order to that of vanillin is then stirred in. This composition is then dissolved and can be greatly diluted in water.

I have found that particularly satisfactory results are obtained where the amount of vanillin approximately equals the amount of caramel and is about four times as great as that of coumarin.

The following example of proportions used is supplied to illustrate this invention even better:

Example

| | Ounces |
|---|---|
| Vanillin | ½ |
| Ethyl alcohol (190 proof) | 2 |
| Coumarin | ⅛ |
| Caramel | ½ |
| Water | 124⅞ |

To make approximately one gallon of liquid flavor.

Very good results and all the above-mentioned advantages such as solubility, clearness, permanence of satisfactory taste, and flavor efficiency will be observed where the above or other formulations in accordance with this invention are used.

Additions of natural pure vanilla extract may be effected to produce a so-called "vanilla compound." The material, however, has been found attractive with or without such an addition.

While I have described the preferred embodiments of my invention, it is to be understood that I do not limit my self to the precise constructions herein disclosed and the right is reserved to all changes and modifications coming within the scope of the invention as defined in the appended claim.

Having thus described my invention, what I claim as new and desire to secure by United States Letters Patent is:

A flavoring compound, comprising a quantity of vanillin, a quantity of caramel substantially equal to that of said vanillin, a quantity of coumarin equal to substantially one-fourth the quantity of said vanillin, a quantity of alcohol equal to substantially four times the quantity of said vanillin, and water in a quantity sufficient to raise the volume to one gallon, said vanillin in said compound comprising one-half ounce.

CHARLES LEVY.

REFERENCES CITED

The following references are of record in the file of this patent:

UNITED STATES PATENTS

| Number | Name | Date |
|---|---|---|
| 1,324,538 | Boyles | Dec. 9, 1919 |
| 1,403,473 | Albach | Jan. 17, 1922 |
| 1,602,183 | Thomssen | Oct. 5, 1926 |
| 2,129,047 | Colgin | Sept. 6, 1938 |

FOREIGN PATENTS

| Number | Country | Date |
|---|---|---|
| 13,825 | Great Britain | 190- |